H. E. FINNEY.
TENON CUTTER.
APPLICATION FILED MAR. 18, 1914.
1,145,237.
Patented July 6, 1915.
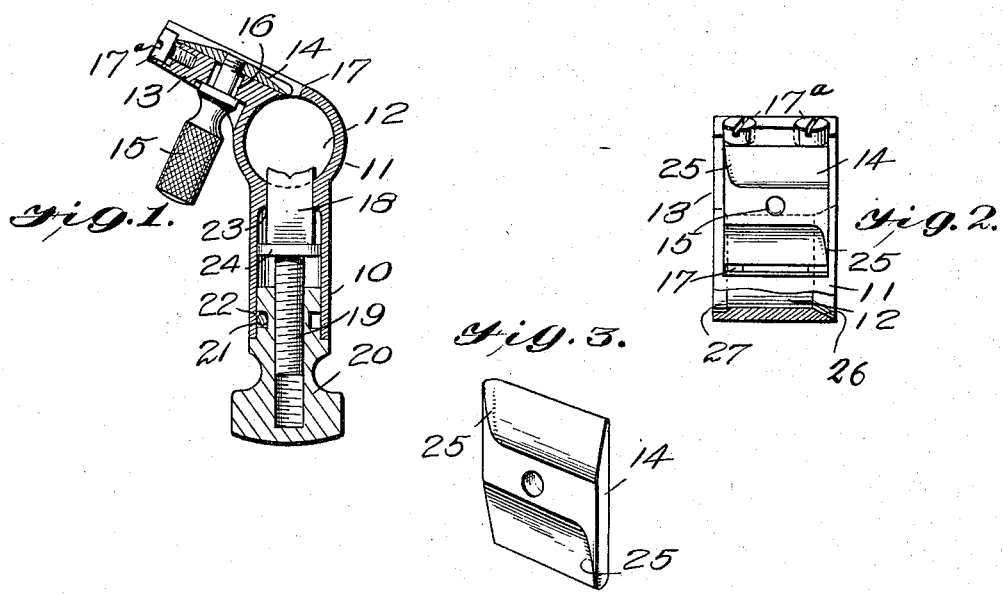
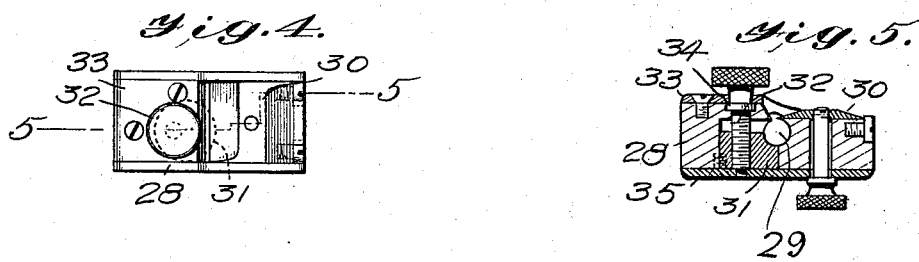
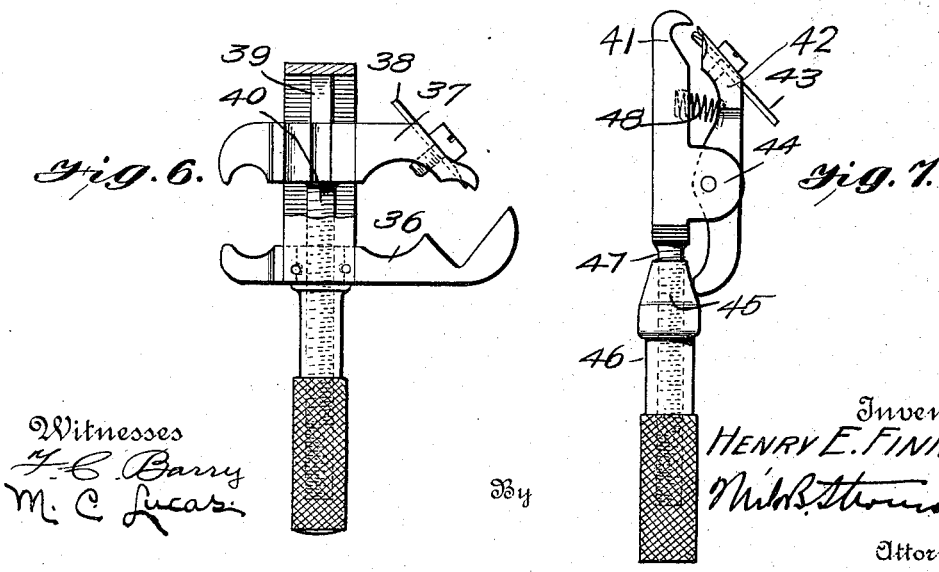
Witnesses
F. C. Barry
M. C. Lucas
Inventor
HENRY E. FINNEY
By
Attorneys

UNITED STATES PATENT OFFICE.

HENRY E. FINNEY, OF CHICAGO, ILLINOIS.

TENON-CUTTER.

1,145,237.  Specification of Letters Patent.  Patented July 6, 1915.

Application filed March 18, 1914. Serial No. 825,540.

*To all whom it may concern:*

Be it known that I, HENRY E. FINNEY, a citizen of the United States, residing at Chicago, in the county of Cook and State of Illinois, have invented certain new and useful Improvements in Tenon-Cutters, of which the following is a specification.

This invention relates to tools for cutting or trimming tenons on wooden pins and the like, and its object is to provide a simple and efficient tool of this kind which is adjustable for different sized tenons and which makes a smooth and accurate job.

In the accompanying drawing forming a part of this specification, Figure 1 is a vertical section showing one embodiment of the invention; Fig. 2 is an end view thereof partly broken away, and Fig. 3 is a perspective view showing the cutting bit of the device; Fig. 4 is a plan view showing another embodiment of the invention; Fig. 5 is a cross-section on the line 5—5 of Fig. 4, and Figs. 6 and 7 are elevations showing two other modifications of the invention.

Referring specifically to the drawing, and more particularly Figs. 1 and 2, 10 denotes the shank of the tool, the same having at its forward end an enlargement or head 11 provided with a transverse bore 12 to receive the work. The head also has a side extension 13 carrying a cutting bit 14. The bottom of the extension has a recess in which the bit seats and is held by a screw 15 passing through a slot 16 in the extension and screwed into the bit. The cutting edge of the bit extends tangentially into the bore 12 through a slot 17 in the head 11. The slot 16 runs in the direction of the bore so that upon backing the screw 15 the extent to which the bit projects into the bore may be varied according to the depth of the cut desired. The rear end of the bit abuts against the heads of two adjusting screws 17ª threaded into the outer end of the extension 13, and serving to set the bit laterally. As shown, the bit has a cutting edge at each end so that it may be reversed.

The bore 12 is of sufficient diameter to receive the work and in order to reduce the diameter of said bore to adapt the same for work of smaller diameter, a reducing block 18 is provided, the same being carried by one end of a screw stem 19 which latter is screwed at its opposite end into a nut 20 rotatably mounted on the butt end of the shank 10 and held against travel in the direction of its length by a pin 21 carried by the shank and extending into a circumferential groove 22 in the nut. Upon turning the nut, the block 18 is advanced into the bore 12, or retracted, in an obvious manner. The shank 10 is tubular to accommodate the screw stem 19, and the block 18 seats slidably in a recess opening from the hollow of the shank into the bore 12. The block is angular in cross-section and the recess in which it works is correspondingly shaped, whereby the screw stem is prevented from rotating, but is advanced or retracted when the nut 20 is turned. At the inner end of the recess in which the block works is a shoulder 23 which is in the path of an outstanding base flange 24 on the block, to limit the outward travel of the block. The flange is circular and has a sliding fit in the hollow of the shank 10 to guide the screw stem. The outer working end of the block 18 is concave to fit the work.

In operation, the work is inserted into the bore 12, and turned, or the tool may be turned and the work held stationary. The bit cuts the part to be trimmed perfectly round and of uniform diameter. As the diameter of the part is reduced the block 18 may be advanced to keep the work straight in the bore. The bit makes a perfectly smooth and even cut.

In order that the work may not split where the cut starts, the cutting edge of the bit 14 has a slight bend 25 at one end outward of the surface of the work, this bend being located at the entrance end of the bore 12. This end of the bore is flared slightly, as indicated at 26, which makes the work easier to insert if it is of the same diameter as the bore.

Figs. 4 and 5 show another embodiment of the invention. A block 28 is provided having a transverse work-receiving opening 29 into which the bit 30 carried by said block extends. The reducing member of the opening 29 is a cylindrical plug 31 seating in a recess leading to said opening. That end of the plug which is adapted to be extended into the opening has a groove to fit the work. The plug is adjusted by a non-traveling screw 32 threaded therethrough, The screw is held against travel in the direction of its length by a plate 33 secured to the top of the block 28 over a shoulder 34 on the screw. On the bottom of the block 28 is mounted a retaining plate 35 for the plug 31.

Fig. 6 shows another embodiment of the invention. Here the work is placed between stationary and sliding jaws 36 and 37, respectively, said jaws having opposite faces which are shaped to receive the work. The sliding jaw 37 carries a bit 38. The stationary jaw is formed with a slideway 39 in which the jaw 37 is mounted, adjustment of the latter being effected by a screw stem 40.

The modified tool shown in Fig. 7 comprises a fixed jaw 41 and a pivoted jaw 42, the latter carrying a bit 43. The fixed jaw has ears 44 to which the jaw 42 is pivoted. The rear portion of the jaw 42 engages a conical surface 45 on a stem 46 which is adjustable lengthwise by being screwed on a threaded stem 47 extending from the jaw 41. The jaw 42 is swung toward the jaw 41 by advancing the cone, and upon retracting the same, a spring 48 engaging the jaw 42 swings the same outward of the jaw 41.

Each of the bits in the modified structures has a bend at the starting end of the cutting edge for the purpose hereinbefore described.

I claim:

1. A tenon cutter comprising a hollow shank having a bit carrying portion and a transverse bore into which the bit extends tangentially, a non-traveling nut carried by the shank, a screw stem threaded into the nut and passing through the hollow of the shank, said shank having a recess opening from the hollow to the aforesaid bore, and a block carried by the screw stem, said block seating in the recess and being adjustable to extend into the bore.

2. A tenon cutter comprising a hollow shank having a bit carrying portion and a transverse bore into which the bit extends tangentially, a non-traveling nut carried by the shank, a screw stem threaded into the nut and passing through the hollow of the shank, said shank having a shoulder and a recess opening from the hollow to the aforesaid bore, and a block carried by the screw stem, said block seating in the recess and being adjustable to extend into the bore, and the block having an outstanding flange into the path of which the aforesaid shoulder extends to limit the outward travel of the block.

In testimony whereof I affix my signature in presence of two witnesses.

HENRY E. FINNEY.

Witnesses:
S. J. LEHRER,
H. G. BATCHELOR.

Copies of this patent may be obtained for five cents each, by addressing the "Commissioner of Patents. Washington, D. C."